United States Patent [19]

Vaughn

[11] Patent Number: 4,714,297

[45] Date of Patent: Dec. 22, 1987

[54] FLUID PRESSURE BRAKE CONTROL PORTION

[75] Inventor: Lawrence E. Vaughn, Watertown, N.Y.

[73] Assignee: General Signal Corporation, Stamford, Conn.

[21] Appl. No.: 844,660

[22] Filed: Mar. 27, 1986

[51] Int. Cl.$^4$ .............................................. B60T 15/32
[52] U.S. Cl. ............................................ 303/33; 303/7; 303/22 R
[58] Field of Search ................ 303/8, 9, 7, 38, 39, 303/33, 35, 36, 37, 22 R, 23 R, 60

[56] References Cited

U.S. PATENT DOCUMENTS 3,671,086 7/1972 Scott ............................ 303/22 R X
4,339,155 7/1982 Hart .................................. 303/33 X Primary Examiner—Andres Kashnikow
Assistant Examiner—Matthew C. Graham
Attorney, Agent, or Firm—Robert R. Hubbard; Harold S. Wynn

[57] ABSTRACT

A fluid pressure control portion for a fluid brake motor is inserted in a fluid pressure control passage between a triple valve and a brake motor for a particular car truck. This portion comprises a proportioning valve connected to an inshot valve through a pipe bracket to proportionally reduce brake pressure on a particular brake motor, after inshot at the same pressure as other brake motors of the same vehicle to adjust braking in accordance with lighter loading of end trucks for articulated freight cars.

2 Claims, 1 Drawing Figure

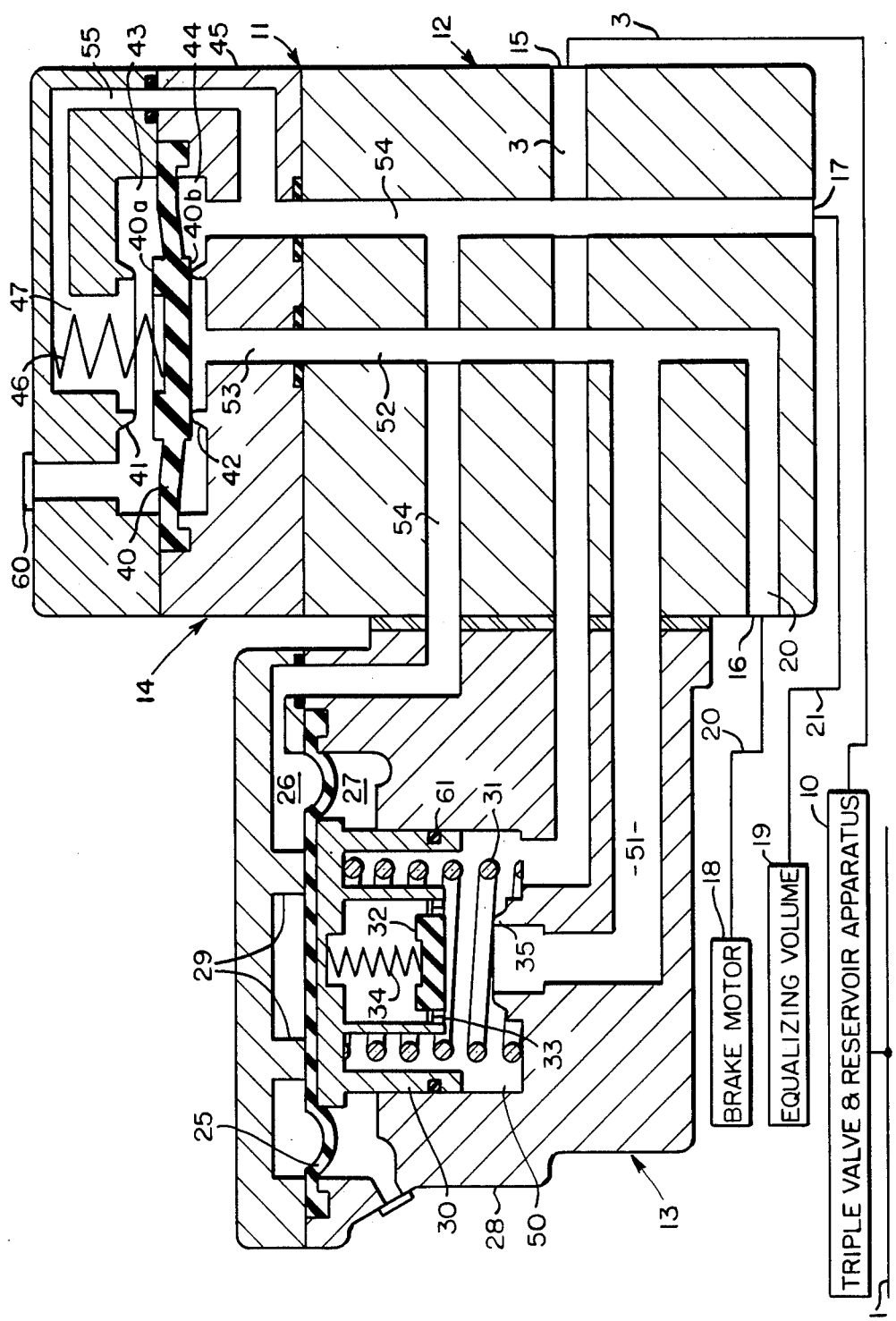

FLUID PRESSURE BRAKE CONTROL PORTION

REFERENCE TO PRIOR CASES

This invention relates to prior Engle U.S. Pat. Nos. 3,910,641, granted Oct. 7, 1975 and 4,080,005, granted Mar. 21, 1978, which are assigned to the same assignee as the present invention and to the Scott U.S. Pat. No. 3,671,086, granted June 20, 1972. These patents are incorporated herein by reference for a better understanding of the background of the present invention.

BACKGROUND OF THE INVENTION

The present invention relates to fluid pressure brake control systems for railroads, and it more particularly pertains to a fluid pressure brake control portion of such a system.

Weight distribution in intermodal articulated freight cars, such as is disclosed in the Engle U.S. Pat. No. 3,910,641, for example, generally loads intermediate trucks heavier than the end trucks. It is therefore desirable to use the same type of brakes on all trucks and modify braking pressures for the end trucks to be only a certain percentage, such as 60%, for example, of the braking pressure provided for the intermediate trucks. This modification can be accomplished by using the conventional empty-load brake equipment, such as is disclosed in the Engle and Scott U.S. Pat. Nos. 4,080,005 and 3,671,086 respectively.

These systems use changeover valves to sense weight on the trucks, but because the end trucks will always operate at the reduced pressure, the changeover devices do not need to be operated as only the empty setting is needed, so the weight sensing arms are removed, and the changeover valves remain in their empty positions to render proportioning valves always effective to provide 60%, for example, of the braking pressure for delivery to brake motors in the end trucks of the articulated vehicle.

An object of the present invention is to provide proportional braking pressure for end truck braking motors in a matter obviating some of the limitations of prior systems.

Another object of the present invention is to provide an improved and less costly proportional braking system for the braking motors of at least one truck of a railway vehicle.

Other objects, purposes and characteristic features, will be in part obvious from the accompanying drawings, and in part pointed out as the description of the invention progresses.

SUMMARY OF THE INVENTION

A fluid brake control system is provided for a multiple truck vehicle comprising triple valve control apparatus for supplying fluid from at least one reservoir to brake motors on the respective trucks, comprising a fluid pressure control portion connected between the triple valve apparatus and a predetermined brake motor for limiting fluid pressure in that motor as compared to similar motors for at least one other truck of the vehicle. The brake control portion comprises proportioning valve and inshot valve apparatus for selectively governing pressure applied by the triple valve apparatus to the predetermined brake motor first at full output pressure of the triple valve apparatus, and then at proportional pressure, without the use of a changeover valve. The proportioning valve and inshot valve are connected respectively to different sides of a pipe bracket.

IN THE DRAWING

The drawing is an elevational schematic sectional view, partly by block diagram, illustrating a prefered embodiment of the present invention.

DETAILED DESCRIPTION OF THE PREFERRED EMBODIMENT

With reference to the drawing, a brake control system for a railway car of the type described comprises a triple valve and reservoir apparatus 10 connected to a conventional brake pipe 1.

A typical brake control apparatus for an end truck of the car comprises a fluid pressure brake control portion 11, having a pipe bracket 12 to which is connected a proportional valve 13 and an inshot valve 14. The proportional valve 13 is illustrated as connected to the left hand side of pipe bracket 12, while the inshot valve 14 is connected to the top of the pipe bracket 12 as illustrated.

The pipe bracket 12 has passages interconnecting the proportioning valve 13 and the inshot valve 14, and pipe bracket 12 has a port 15 connected over a passage 3 to the triple valve and reservoir apparatus 10. The pipe bracket 12 also has ports 16 and 17 connected respectively to a brake motor 18 and an equalizing volume 19 respectively over passages 20 and 21.

The proportioning valve 13 controls the flow of fluid to the brake motor 18 and is calibrated in such a way that the brake motor pressure is proportioned to be 60% of the brake call pressure of the triple valve apparatus 10 when the pressure is above minimum service pressure. The inshot valve 14 determines the point at which pressure proportioning will begin during a brake application and provides a means for draining the pressure from the equalizing volume 19 during release of the brakes. The equalizing volume 19 is used to maintain proper calibration of the triple valve and reservoir apparatus 10 during pressure proportioning and can be sized to accomodate any brake motor volume. The pipe bracket 12 is common to both the proportioning valve 13 and the inshot valve 14 and allows the proportioning valve portion to be mounted in line at any convenient point between the triple valve and reservoir apparatus 10 and the brake motor 18. The pipe bracket 12, for example, could be located adjoining the triple valve and reservoir apparatus 10.

The proportioning valve 13 has a diaphragm 25 seperating chambers 26 and 27 formed in a housing 28 on upper and lower sides respectively of the diaphragm 25. With the brakes in their released positions, diaphragm 25 is held against stops 29 by a piston 30 beneath the diaphragm 25 that is spring biased upwardly by a calibrating spring 31. The piston 30 contains a poppet valve 32 that is biased downwardly against a stop 33 by a coaxial spring 34. The valve 32 faces a seat 35 in the housing 28 so that the valve 32 can be closed when the piston 30 is driven downwardly by pressure differential across diaphragm 25 and the lower end of piston 30 which is sealed by "O" ring 61.

The inshot valve 14 has a diaphragm 40 having upper and lower valve faces 40a and 40b respectively on upper and lower sides thereof for cooperating with upper and lower valve seats 41 and 42, which in turn, are in chambers 43 and 44 formed respectively above and below diaphragm 42 in a housing 45. The inshot valve 14 is biased to a downwardly closed position when the car brakes are released by a calibrating spring 46 in a chamber 47.

OPERATION

Brake Application

Before initiation of a brake application, the proportioning valve 13 has its piston 30 biased to an upward position by spring 31, and the inshot valve 14 has its diaphragm 40 biased to a downward position by spring 46 so that the diaphragm rests on the seat 42. Upon sensing a reduction in the brake pipe 1 pressure, the triple valve and reservoir apparatus 10 is actuated to deliver an output over passage 3 to a chamber 50 beneath the proportioning valve piston 30. With the piston 30 already in its upper position, the check valve 32 is open and permits the flow of fluid from chamber 50 through passages 51 and 20 to the brake motor 18. Fluid is also applied from passage 51 over passage 52 to a small area 53 beneath the valve face 40b of the diaphragm 40 for permitting fluid to be applied to brake motor 18 at full pressure until the brake cylinder pressure exceeds a fixed amount such as 12 psi, at which time the spring 46 in the inshot valve 14 becomes compressed to lift the diaphragm 40 and expose a larger area beneath the diaphragm 40 to the brake cylinder pressure to cause the opening of the lower check valve of the diaphragm 40 by snap action to deliver fluid from passage 52 through passage 54 to chamber 26 above the diaphragm 25 of the proportioning valve 13. Fluid presssure in passage 54 also flows through passage 21 to the equalizing volume 19. This actuation of the diaphragm 40 of the inshot valve 14 also closes an upper valve face 40a against seat 41 to seal off a passage 55 from vent chamber 43 above diaphragm 40.

When the pressure in chamber 26 above diaphragm 25 and the equalizing volume are equal to 60%, for example, of the pressure in chamber 50 beneath piston 30, piston 30 is moved downwardly, closing check valve 32 against the seat 35 and cutting off passage of fluid to the brake motor 18. Should a heavier brake application be called for, the increased pressure applied over passage 3 will be effective to move piston 30 to its upper position to again permit supply of fluid to the brake cylinder 18 to proportionally increase the braking pressure in accordance with the increase that has been called for by the triple valve apparatus 10.

Brake Release

To initiate brake release, the pressure in the brake pipe 1 is increased, the triple valve and reservoir apparatus 10 sense this increase and vent passage 3 to atmosphere, thus reducing the pressure above the check valve 32 in the proportioning valve 13 and permitting that valve to move upwardly and vent the brake motor 18 through passages 20 and 51, chamber 50, and passage 3 to the triple valve apparatus 10. At the same time, the equalizing volume 19 is vented through passages 21 and 54, chamber 44, passages 52 and 51, chamber 50 beneath piston 30 of the proportioning valve 13 and chamber 3 to the triple valve and reservoir apparatus 10.

When the pressure in chambers 44 and 53 beneath the diaphragm 40 of the inshot valve 14 has been reduced to less than 8 psi, for example, the diaphragm 40 moves downwardly to close the lower check valve 40b and to open its upper check valve 40a to permit venting of the chamber 43 above the diphragm 40 through a vent port 60. This permits the venting of chamber 26 above diaphragm 25 in the proportioning valve 13 to be completed as well as the venting of the equalizing volume 19.

Having thus described a fluid pressure brake control portion as a perferred embodiment of the present invention, it is to be understood that various modifications and alterations may be made to the specific embodiment shown, without departing from the spirit or scope of the invention.

What is claimed is:

1. A fluid brake control system for a multiple truck vehicle comprising triple valve and reservoir means on the vehicle for governing supply of fluid from a reservoir to brake motor means on the respective trucks comprising;
    (a) a fluid pressure control portion connected between the triple valve and reservoir means and a predetermined brake motor of the brake motor means for limiting fluid pressure in that motor,
    (b) the fluid pressure control portion comprising;
        (1) proportioning valve means for proportioning fluid pressure delivered to the predetermined fluid brake motor relative to fluid pressure delivered to the fluid pressure control portion by the triple valve means, and
        (2) inshot poppet valve means for selectively governing the proportioning valve means during brake application,
    (c) the fluid pressure control portion comprising a pipe bracket through which the proportioning valve means and the inshot poppet valve means have interconnecting fluid passages,
    (d) the proportioning valve means having a diaphragm seperating upper and lower fluid chambers in proportioning valve housing means;
        (1) a piston spring biased against the diaphragm in the lower chamber,
        (2) a poppet valve contained within the piston disposed to be spring biased downwardly to at times actuate its face against a seat in the proportioning valve housing means to close a fluid passage from the triple valve to the brake motor through the pipe bracket, and
        (3) the upper chamber being connected by a fluid passage through the pipe bracket to an equalizing volume, and
    (e) the inshot poppet valve means being operable to permit the proportioning valve means to be effective to reduce fluid pressure delivered to the fluid motor as compared to fluid pressure delivered to the proportioning valve means by the triple valve and reservoir means only after a predetermined minimum pressure has been applied to the fluid motor.

2. A fluid brake control system for a multiple truck vehicle comprising triple valve and reservoir means on the vehicle for governing supply of fluid from a reservoir to brake motor means on the respective trucks comprising;
    (a) a fluid pressure control portion connected between the triple valve and reservoir means and a predetermined brake motor of the brake motor means for limiting fluid pressure in that motor,
    (b) the fluid pressure control portion comprising;
        (1) proportioning valve means for proportioning fluid pressure delivered to the predetermined fluid brake motor relative to fluid pressure delivered to the fluid pressure control portion by the triple valve means, and (2) inshot poppet valve means for selectively governing the proportioning valve means during brake application, (c) the fluid pressure control portion comprising a pipe bracket through which the proportioning valve means and the inshot poppet valve means have interconnecting fluid passages, (d) the inshot poppet valve means comprises;

(1) double faced diaphragm poppet valve means separating upper and lower fluid chambers in inshot valve housing means, (2) the inshot housing means having seats in the inshot upper and lower chambers cooperating with respective faces of the double faced diaphragm, (3) fluid passage means connecting a lower face of the double faced diaphragm through a passage in the pipe bracket to the brake motor, (4) fluid passage means for connecting an upper face of the double faced diaphragm through a passage of the pipe bracket to an equalizing volume, and (e) the inshot poppet valve means being operable to permit the proportioning valve means to be effective to reduce fluid pressure delivered to the fluid motor as compared to fluid pressure delivered to the proportioning valve means by the triple valve and reservoir means only after a predetermined minimum pressure has been applied to the fluid motor.

* * * * *